United States Patent
Glantz et al.

(10) Patent No.: US 11,440,560 B2
(45) Date of Patent: Sep. 13, 2022

(54) SYSTEM AND METHOD FOR AUTOMATIC CONFIGURATION OF A ROAD SENSOR UNIT

(71) Applicant: VALERANN LTD., Tel Aviv (IL)

(72) Inventors: Ido Glantz, Tel Aviv (IL); Avi Tel-Or, Aseret (IL); Lior Simchon, Tel Aviv (IL); Shahar Bahiri, Tel Aviv (IL)

(73) Assignee: VALERANN LTD., Tel Aviv (IL)

( * ) Notice: Subject to any disclaimer, the term of this patent is extended or adjusted under 35 U.S.C. 154(b) by 1 day.

(21) Appl. No.: 16/926,095

(22) Filed: Jul. 10, 2020

(65) Prior Publication Data

US 2021/0009146 A1  Jan. 14, 2021

Related U.S. Application Data

(60) Provisional application No. 62/872,261, filed on Jul. 10, 2019.

(51) Int. Cl.
*B60W 50/04* (2006.01)

(52) U.S. Cl.
CPC ....... *B60W 50/045* (2013.01); *B60W 2552/53* (2020.02)

(58) Field of Classification Search
CPC ........ B60W 50/045; H04W 4/40; H04W 4/50
See application file for complete search history.

(56) References Cited

U.S. PATENT DOCUMENTS

| | | | | |
|---|---|---|---|---|
| 10,323,369 | B2* | 6/2019 | Bahiri | F21S 8/032 |
| 11,198,444 | B2* | 12/2021 | Zhang | B60W 50/045 |
| 2017/0002527 | A1* | 1/2017 | Bahiri | E01F 9/559 |
| 2017/0086103 | A1* | 3/2017 | Neves | H04W 84/005 |
| 2017/0086241 | A1* | 3/2017 | Lopes | H04L 41/0846 |
| 2017/0176192 | A1* | 6/2017 | Cardoso de Moura | H04W 4/024 |
| 2017/0215021 | A1* | 7/2017 | de Azevedo | H04W 24/10 |
| 2018/0063286 | A1* | 3/2018 | Braga Ameixieira | H04L 67/34 |
| 2018/0184270 | A1* | 6/2018 | Chun | H04W 4/40 |
| 2018/0191551 | A1* | 7/2018 | Chun | H04W 76/20 |
| 2018/0199223 | A1* | 7/2018 | Kim | H04W 4/40 |
| 2018/0206211 | A1* | 7/2018 | Seo | H04W 72/02 |
| 2018/0359707 | A1* | 12/2018 | Chae | H04W 52/383 |
| 2019/0086047 | A1* | 3/2019 | Jiang | F21V 23/06 |
| 2019/0090109 | A1* | 3/2019 | Moreira de Carvalho | H04W 4/50 |
| 2019/0110175 | A1* | 4/2019 | Chun | H04W 80/08 |

(Continued)

*Primary Examiner* — Peter D Nolan
*Assistant Examiner* — Wae L Louie
(74) *Attorney, Agent, or Firm* — Pearl Cohen Zedek Latzer Baratz LLP (57) ABSTRACT

A system and a method for automatically configuring a road sensor unit. Embodiments of the invention include detecting, by the road sensor unit, an identification unit of a road socket unit upon insertion of the road sensor unit into the road socket unit, reading, by the road sensor unit, a unique designation of the identification unit of the road socket unit, transmitting, by the road sensor unit, the unique designation and a unique sensor identification of the road sensor unit to a remote server, receiving, by the road sensor unit from the remote server, unique parameters, wherein the unique parameters are based on the unique designation of the identification unit, configuring, by the road sensor unit, the road sensor unit to operate based on the unique parameter and operating said road sensor unit with the configuration.

22 Claims, 5 Drawing Sheets

(56) References Cited

U.S. PATENT DOCUMENTS

| | | | |
|---|---|---|---|
| 2019/0205115 A1* | 7/2019 | Gomes | H04W 4/50 |
| 2020/0008044 A1* | 1/2020 | Poornachandran | H04W 24/08 |
| 2020/0162980 A1* | 5/2020 | Kalkunte | H04W 16/28 |
| 2020/0296155 A1* | 9/2020 | McGrath | G06F 9/5027 |
| 2020/0382992 A1* | 12/2020 | Shilov | H04W 72/02 |
| 2021/0009146 A1* | 1/2021 | Glantz | G08G 1/02 |
| 2021/0352607 A1* | 11/2021 | Miao | H04W 56/0045 |

* cited by examiner

SYSTEM AND METHOD FOR AUTOMATIC CONFIGURATION OF A ROAD SENSOR UNIT

CROSS-REFERENCE TO RELATED APPLICATIONS

This application claims the benefit of U.S. Provisional Patent Application No. Ser. No. 62/872,261, filed on Jul. 10, 2019 which is incorporated in its entirety herein by reference.

FIELD OF THE INVENTION

The present invention relates generally to smart road sensors, and more particularly to a means for automatically configuring conveniently connectable smart road sensors.

BACKGROUND OF THE INVENTION

Intelligent road monitoring systems using discrete sensing nodes, may be useful in highlighting and proliferating awareness of existing and/or developing road and traffic related incidents. The deployment of such road monitoring systems may be nontrivial as each sensing node may typically be configured respective to its global and/or relative location within the road network. This can be important as subsequent processing, such as the localization of traffic accidents, may be more accurately calculated if data obtained from sensing nodes is correctly correlated to specific discrete locations within the road network.

Existing road monitoring systems may achieve geolocation configuration during installation as a result of an engineer physically undertaking an ad-hoc configuration activity. This may include, for example, measuring the precise geolocation of the road sensor in situ, recording relevant identification data into an onboard memory component and/or a remote database, and/or interconnecting a monitoring system into a wider road monitoring network. Such configuration activities can be laborious and/or impractical due to, for example, the number of nodes that may need to be installed, and/or the time that can be required to configure each. In person physical configuration of monitoring systems may be undesirably prone to installation fault or configuration error due to, for example, human error, each of which may impede subsequent processing accuracy.

Therefore, it may be desirable for an automatically configuring smart road sensor which may be expeditiously installed and connected into a road network as well as for identifying installation fault and/or theft of road sensor units from within an established road network.

SUMMARY OF THE PRESENT INVENTION

A system and a method for automatically configuring a road sensor unit. Embodiments of the invention may include detecting, by the road sensor unit, an identification unit of a road socket unit upon insertion of the road sensor unit into the road socket unit, reading, by the road sensor unit, a unique designation of the identification unit of the road socket unit, transmitting, by the road sensor unit, the unique designation and a unique sensor identification of the road sensor unit to a remote server, receiving, by the road sensor unit from the remote server, unique parameters, wherein the unique parameters are based on the unique designation of the identification unit, configuring, by the road sensor unit, the road sensor unit to operate based on the unique parameter and operating said road sensor unit with the configuration.

Embodiments of the invention may include updating the remote server of a link between the unique designation and the unique sensor identification.

Embodiments of the invention may include installing the road sensor unit into the road socket unit by locating the configuration unit of the road sensor unit and the identification unit of the road socket unit within a predefined distance to allow the reading of the unique designation of the identification unit by the configuration unit of the road sensor unit.

According to some embodiments of the invention, transmitting and receiving is performed via a gateway unit connected to the road sensor unit and the remote server.

Embodiments of the invention may include linking the unique designation to the unique parameters by checking a linking table stored in the remote server.

Embodiments of the invention may include periodically scanning by the road sensor unit for one or more identification unit of one or more road socket units.

Embodiments of the invention may include comprising issuing an alert by the road sensor unit when a predefined event is occurred. The alert is indicated by one or more Light Emitting Diodes (LEDs) disposed on said road sensor unit.

Embodiments of the invention may include transmitting and receiving is performed via wireless communication connectivity.

A system and a method for automatically configuring a road sensor unit. Embodiments of the invention may include detecting, by the road sensor unit, an identification unit of a road socket unit upon insertion of the road sensor unit into the road socket unit, reading, by the road sensor unit, a unique designation of the identification unit of the road socket unit and unique parameters related to configuration of the road sensor unit, configuring, by the road sensor unit, the road sensor unit to operate based on the unique parameter, operating said road sensor unit with the configuration and transmitting, by the road sensor unit, the unique designation of the identification unit, the unique parameters and a unique sensor identification to a remote server.

Embodiments of the invention may include a system for automatically configuring a road sensor unit, the system including a road socket unit comprising an identification unit; and a road sensor unit configured to be inserted into the road socket unit, the road sensor unit comprising a processor configured to: detect an identification unit of the road socket unit upon insertion of the road sensor unit into the road socket unit, read a unique designation of the identification unit of the road socket unit, transmit the unique designation and a unique sensor identification of the road sensor unit to a remote server, receive from the remote server, unique parameters, the unique parameters are based on the unique designation of the identification unit, configure the road sensor unit to operate based on the unique parameter and operate the road sensor unit with the configuration.

According to embodiments of the invention, the processor is configured to update the remote server of a link between the unique designation and the unique sensor identification.

According to embodiments of the invention, the processor of the road sensor unit and the identification unit of the road socket unit are located within a predefined distance to allow the reading of the unique designation of the identification unit by the configuration unit of the road sensor unit.

According to embodiments of the invention, a gateway unit connected to the road sensor unit and to the remote server to transmit and receive information to and from the road sensor unit and the remote server.

According to embodiments of the invention, the road sensor unit includes one or more Light Emitting Diodes (LEDs) to indicate when a predefined event is occurred.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

The term "geospatial location" may be used herein to refer generally to location information denoting a feature on or above the Earth's surface relative to an Earth centered frame of reference. For example, geospatial location data may be obtained using satellite-based positioning systems, e.g., Global Navigation Satellite Systems (GNSS) such as GPS, GLONASS, Galileo, BeiDou, or the like. The accuracy with which a geospatial location data may be obtained and may be further enhanced using Real-time Kinematic (RTK) techniques, or the like.

The term "server" may be used herein to refer to a computer or a computer program, that may be accessible over a communications medium, such as a communications network or other computer network, including the Internet and may provide services to, or performs functions for, other computers, computer programs and/or their users.

Figure 1A:
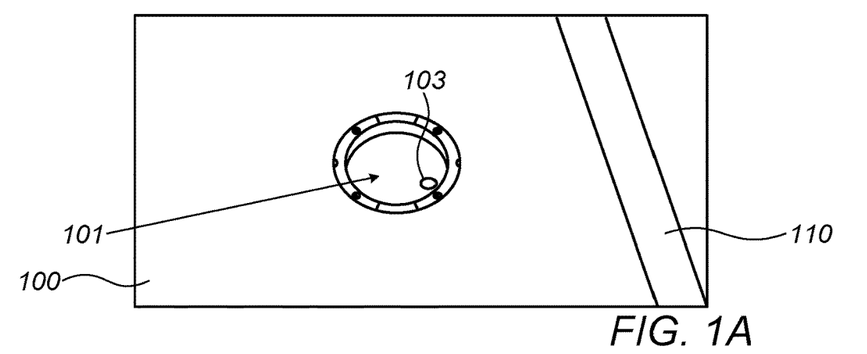
FIGS. 1A and 1B are schematic illustrations of an auto-configuring road socket unit and an auto-configuring road sensor unit according to embodiments of the present invention.
Figure 1B:
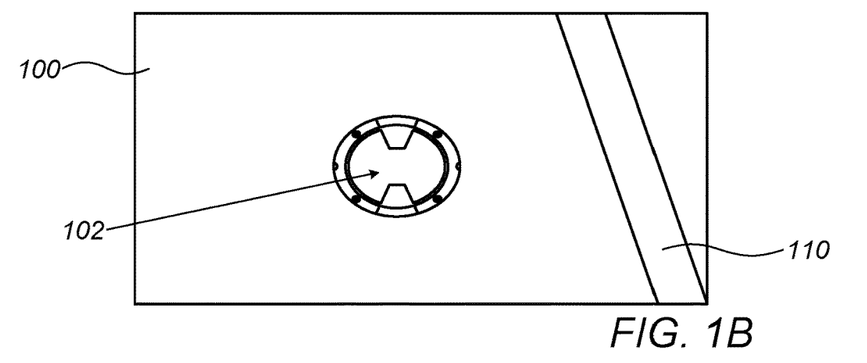

FIGS. 1A and 1B are schematic illustrations of an auto-configuring socket (e.g., a road socket unit) and auto-configuring sensor (e.g., road sensor unit) disposed therein, according to embodiments of the present invention. The road socket unit 101, shown in FIG. 1A may be located within a road or highway 100. Road socket unit 101 may be implanted, inserted and secured into a surface of a road 100, e.g., into a cavity in the asphalt of road 100. Road socket unit 101 may have dimensions, shape and form to securely connect, attach or link to an auto-configuring road sensor unit 102 which may fit into road socket 100. Smart road sensor unit 102 may be inserted into road socket 101 and located inside road socket 101 as shown in FIG. 1B.

According to embodiments of the invention, road socket unit 101 can be a socket (e.g., a physical element having a concave shape, a square shape, a rectangular shape, a round shape, and/or any other shape as is known in the art). The road socket unit 101 can be constructed of materials that can withstand weather conditions, high temperatures, damage from passing cars and other outside possible damages. The road socket unit 101 can have a shape and/or be sized such that the road sensor unit 102 (e.g., a sensor) can be positioned therein. The road socket unit 101 may include an identification unit which can be, for example, a radio-frequency identification (RFID) tag. The road sensor unit 102 can be a sensor used in roads and embedded in roads infrastructure. The road sensor unit can have any type of sensor to sense information from road systems, e.g., a magnetic sensor, a vibration sensor, an acoustic sensor, a radar, a light sensor and/or any other sensor as is known in the art.

According to embodiments of the invention, a plurality of road socket units 101 and road sensor units 102 may be installed and distributed at substantially uniform intervals e.g., every 9-20 meters, along road 100. The road socket units 101 and road sensor units 102 may be located or positioned in a combined manner, shown in FIG. 1B, at either side of road 100, at either side of a lane included in road 100, along marking lines 110 of road 100, in or within a lane included in road 100 or in any other boundary location of road 100. Installation of an auto-configuring smart road sensor unit 102 may be achieved by insertion, e.g., through mechanical action, and a secured connection e.g., using bolts, screws or any other attachment elements of road sensor unit 102 into a vacant road socket unit 101.

Figure 2A:
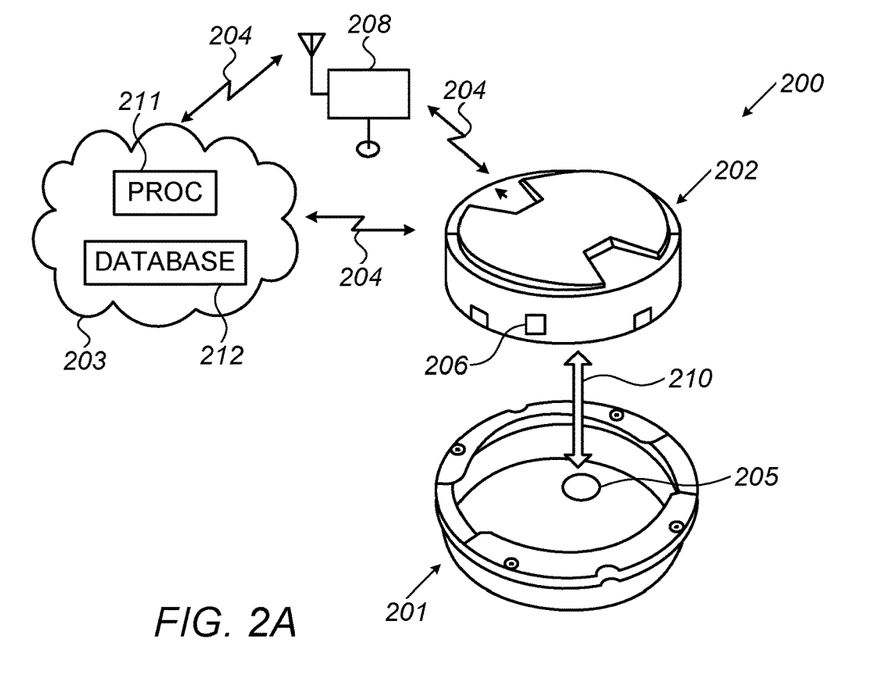
FIG. 2A is a schematic illustration of a system for auto-configuring road sensor units according to embodiments of the present invention.

Reference is made now to FIG. 2A which is a schematic illustration of a system for auto-configuring road sensor units according to embodiments of the present invention. System 200 may include a road sensor unit 202, a road socket unit 201, a remote processing facility or remote server 203 and a gateway unit 208. Road sensor unit 202 may be, for example, road sensor unit 102 of FIG. 1B and road socket unit 201 may be, for example, road socket 101 of FIG. 1A. Road sensor unit 202 may be connected to road socket unit 201 via a communication link or network and may be further connected to remote server 203 directly or via gateway unit 208 via one or more wired or wireless communication networks 204.

Figure 2B:
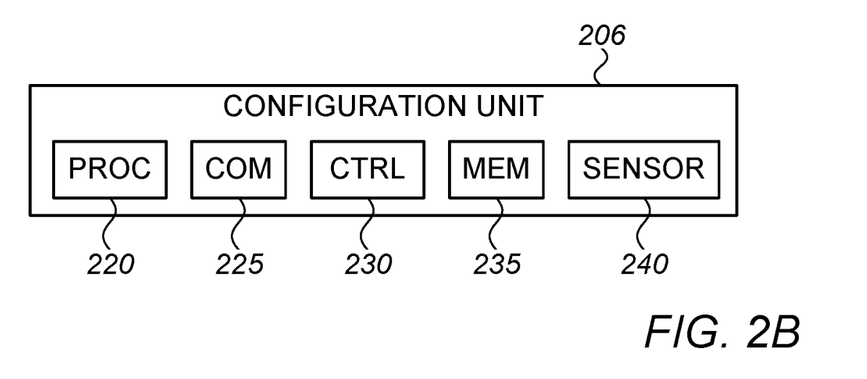
FIGS. 2B and 2C are schematic block diagrams of a configuration unit of a road sensor unit and an identification unit of a road socket unit according to embodiments of the present invention.
Figure 2C:
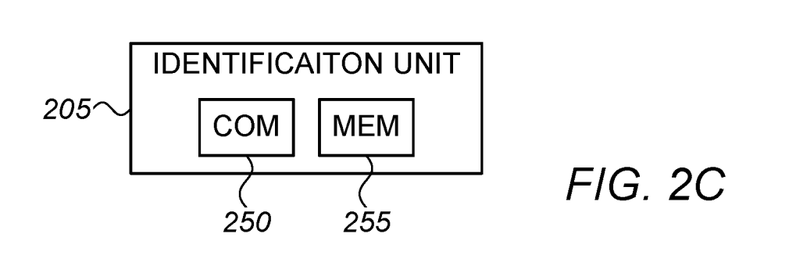

Reference is made now to FIGS. 2B and 2C which are schematic block diagrams of a configuration unit of a road sensor unit and an identification unit of a road socket unit according to embodiments of the present invention. According to embodiments of the invention, road socket unit 201 may include an identification unit 205, shown in FIG. 2C. Identification unit 205 may be any unit, element, module, or tag which may include or store data, parameters or any information related to the identification of socket unit 201 or may be used to identify socket unit 101. Identification unit 205 may include a memory 255 and a communication module 255. Memory 255 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Communication module 250 may by or may include a any unit or element able to transmit and receive a communication signal such as an antenna.

Each road sensor unit 202 may include a configuration unit 206 operable to read, sense, receive, detect, or acquire information from identification unit 205 located in socket 201. Configuration unit 206, shown in FIG. 2B may include a reader or a sensor 240, and may further include or may be connected to a processor 220, a controller 230, a memory 235 and a communication module 225. The road sensor unit 202 may include processor 200 configured to detect an identification unit of the road socket unit upon insertion of the road sensor unit into the road socket unit, read a unique designation of the identification unit of the road socket unit, transmit the unique designation and a unique sensor identification of the road sensor unit to a remote server. The processor 200 is further configured to receive from the remote server, unique parameters, the unique parameters are based on the unique designation of the identification unit, configure the road sensor unit to operate based on the unique parameter and operate said road sensor unit with the configuration.

Configuration unit 206 can be an RFID reader and/or other means as is known in the art. Configuration unit 206 may be implemented by any microprocessors, microcontrollers, field programmable gate arrays (FPGAs), programmable logic devices (PLDs) or application-specific integrated circuits (ASIC) implemented for example, by computing device 1 of FIG. 7.

According to embodiments of the invention, configuration unit 206 may include, contain, or store in memory 235 a unique sensor identification (ID). The unique sensor ID may be a unique number, text, symbol, or string of data that may characterize or identify a specific road sensor unit e.g., sensor unit 202.

Reference is made back to FIG. 2A. According to some embodiments of the invention, when road sensor unit 202 is located within road socket unit 201, e.g., as shown in FIG. 1B, configuration unit 206 and identification unit 205 may be located within a predetermined range or within a predefined distance which may allow communication between configuration unit 206 and identification unit 205. A predefined distance between configuration unit 206 of road sensor unit 202 and identification unit 205 of socket unit 201 may allow sensor unit 202 to read or detect information saved in identification unit 205 via wired or wireless communication link 210 upon insertion of road sensor unit 202 into road socket unit 201. Some embodiments of the invention may use radio-frequency identification techniques such that communication link 210 may be a radio-frequency based communication link, configuration unit 206 may include RFID reader and identification unit 205 may include an RFID tag. For example, RFID tag reader may be formed or implemented as part of a main Printed Circuit Board (PCB) of road sensor unit 202 or configuration unit 206, or as discrete unit connected to a Microcontroller Unit (MCU) of sensor unit 202 or configuration unit 206.

According to embodiments of the invention, upon insertion or connection of sensor unit 202, for example by a dedicated installation machine during an installation procedure, into road socket unit 201, identification unit 205 and configuration unit 206 implemented by, for example, e.g., an RFID tag and an RFID reader may be brought into a predefined required distance such as to allow the unique socket designation and/or unique socket parameters stored in identification unit 205 to be read or detected by configuration unit 206. Road sensor unit 202 may include one or more communication modules which may be used or configured to transmit the unique socket designation and/or unique socket parameters to gateway station 208, located in proximity to the road, e.g., road 100 of FIG. 1, and from it to remote server 203. The transmission of information may be performed by wireless communication module via wireless communication network 204, for example, via Long Range (LoRa) communication, Global System for Mobile Communications (GSM), Dedicated Short Range Communications (DSRC), radio communication network, cellular network, the Internet or any communication network known in the art.

Embodiments of the invention may include a plurality of road sensor unit 202 and/or road sockets 201 which may be communicatively connected, via communication network 204, to one or more gateway units or stations 208. The gateway units 208 may be interspersed and/or distributed at, for example, intervals of 500-1000 meters along the road. Each gateway unit 208 may be operable to communicate with multiple road sensor unit 202 and/or road socket 201. Each gateway unit 208 may receive wireless transmission from one or more road sensor unit 202 and/or road socket 201 which are communicatively connected to it.

Each gateway unit 208 is further connected, via wired or wireless communication network 204, to remote processing facility or server 203 which may include a storage or a database 212 and one or more processors 211 operable to collect information from all gateway units 208, road sensor unit 202, road sockets units 201, traffic monitoring infrastructure and/or connected vehicles, and to perform analysis/assessment based on the information received. The communicative connections 204 between road sensor units 202, gateway units 208, and remote server 203 may be achieved wirelessly using one or more data protocols, such as Long Range (LoRa), Global System for Mobile Communications (GSM), Dedicated Short Range Communications (DSRC), radio communication network, cellular network, the Internet or any communication network. In some embodiments of the invention, remote processing facility or remote server 203 may be a cloud-based system including one or more processors or any computing system having on-demand availability. Some embodiments of the invention may allow direct communication between road road sensor unit 202 and/or road socket unit 201 and remote server 323, e.g., without using gateway units 208 as a mediator.

According to some embodiments of the invention, identification unit 205 may include, contain, or store a unique designation or socket identification (ID) of identification unit 205 of the road socket unit 201. The unique designation may be a unique number, text, symbol, or string of data that may characterize or identify a specific socket unit and may be associated with that specific road socket. For example, the unique socket designation stored in identification unit 205 may be associated exclusively with road socket unit 201.

According to some embodiments of the invention, identification unit 205 may contain or store, in addition to the a unique designation one or more unique parameters or additional unique data or information related to configuration of any sensor unit 202 which may be inserted into road socket unit 201. Unique parameters or unique additional data may include any data related to a specific road socket, e.g., socket 201 and/to a sensor unit, e.g., sensor unit 202 within a road network of a plurality of socket units and sensor units.

Unique parameters or unique additional data may include geospatial location of a road socket, parameters such as GNSS location, system affiliation, radio channels to be used, installation date and time of a road socket, any relative location of a road socket e.g., with respect to Earth/geospatial location, with respect to the road network, the local road name, the position of the road socket relative to traffic flow e.g., on a bend/corner, on a hard shoulder, and the like. Unique parameters or unique additional data may include a designated communication protocol and communication information such as a working frequency, local communications gateway e.g., where communications are achieved with a remote service indirectly and/or communications information, specification and attributes. Unique parameters or unique additional data may include information related to configuration of sensor unit work parameters, for example, configuration of light emitters included in the sensor unit e.g., where red lights may be used to denote a hazardous area and the like.

The unique socket ID and unique parameters may be transmitted from socket 201 to sensor unit 202. Configuration unit 206 of sensor unit 202 may receive the unique socket ID and unique parameters and may transmit the received information and its unique sensor ID to remote server 203, directly or via gateway 208. The unique sensor ID, unique socket ID and unique parameters may be stored in remote database 212 located in or connected to remote server 203 for future reference and/or for correlation with previously stored unique socket parameters.

According to some embodiments of the invention, when identification unit 205 may contain or store only a unique socket ID or designation, database 212 of remote server 203 may store, hold or include a linking database or table, e.g., a hash table, linking the unique socket designation or identification to unique parameters or unique additional data related to configuration of sensor unit. Upon receiving the unique socket ID and unique sensor ID, remote server 203 may pair the unique socket ID with the unique parameters and additional information required for sensor unit 202 and may send the unique parameters and additional information to sensor unit 202 to allow sensor unit 202 to start its operation according to the received parameters. In addition, the unique sensor ID may be updated in database 212 such as sensor unit 202 may be paired or link to socket unit 201.

According to some embodiments of the invention, the unique parameters and unique additional data may be stored within the identification unit 205 in addition to the unique socket ID. In such embodiments of the invention, configuration unit 206 may read the unique socket ID and the unique parameters and may be ready to be configured and start its operation without receiving information from remote server 203. The unique socket parameters, the unique socket ID and the unique sensor ID may nevertheless be transmitted, by configuration unit 206, to remote server 203 for future reference and/or maintenance records.

Embodiments of the invention may provide a system and a method by which auto-configuring road sensor units 202 may be efficiently and expeditiously installed and/or replaced in road sockets 201, for example, owing to their capacity to self-configure absent manual user driven configuration processes. Embodiments of the invention may allow for new road sensor units, namely, without pre-configuration or pre-installation process to be easily, quickly and efficiently installed, and communicate. Embodiments of the invention may allow for previously installed auto-configuring smart road sensor units 202 to be easily, quickly and efficiently replaced. This may be advantageous as it may minimize and/or obviate the requirement for maintenance related road closures and further limits expenditure, for example due to engineer/technician salaries, arising from lengthy configuration processes.

In some embodiments of the invention, configuration unit 206, e.g., an RFID tag reader of road sensor unit 202 may be programmed to intermittently or periodically scan for identification units 205 which may be located in a predefined distance of detection, e.g., proximate RFID tags. The scan may be performed for example once every predetermined time duration, e.g., once every five minutes, ten minutes or once every any duration of time. This may allow the auto-configuring road sensor units 202 to be maintained in a power saving mode until they are 'awoken' by the presence of identification unit 205, e.g., an RFID tag which may indicate an insertion of road sensor unit 202 into road socket unit 201.

In some embodiments of the invention, the unique socket designation and/or the unique socket parameters and/or the unique sensor designation may be encrypted such that they may only be accessed by known and/or authorized personnel or systems. This may be achieved by translating the 'plaintext' e.g., the unique socket designation/parameters using an encryption algorithm to yield cipher information 'ciphertext' that may only be deciphered by entities possessing the correct cipher. This may be an advantageous as it may guard against network infiltration, for example where an attempt is made to insert a fake/manipulated sensor into a road socket unit 201.

Figure 3:
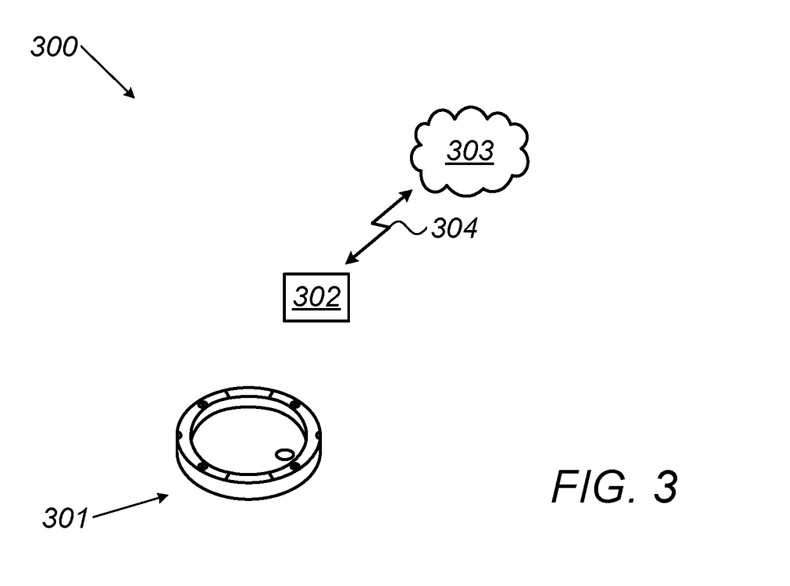
FIG. 3 is a schematic illustration of a system for a road socket unit installation and configuration according to embodiments of the present invention.

FIG. 3 is a schematic illustration of a system for a road socket unit installation and configuration according to embodiments of the present invention. In some embodiments, prior to the process of inserting and installing auto-configuring road sensor units, e.g., road sensor unit 202 of FIG. 2 into a road socket unit, e.g., road socket unit 201, a road socket unit 301 may undergo an initial setup procedure or process. In some embodiments of the invention, identification unit of road socket unit 301 may be preprogrammed, for example during fabrication, to retain or store unique socket ID and unique parameters such as geospatial location data and socket designation of road socket 301. In some embodiments, unique socket designation and unique socket parameters may be programmed or saved to identification unit of road socket unit 301 after fabrication, e.g., before or during process of implanting one or more road sockets units into a road. The initial setup procedure may be performed by a setup unit 302 which may be connected via communication network 304 to a remote server 303. Setup unit 302 may be a composite component included within road socket 301, or a standalone unit connectable with road socket 301. Setup unit 302 may be configured to determine geospatial location data relating to road socket 301 in situ and to send this data, along with corresponding unique socket designation and unique parameters, to remote server 303.

According to embodiments of the invention, an initial setup procedure may include writing data e.g., unique socket ID and unique parameters onto an identification unit, e.g., identification unit 205 of FIG. 2, obtaining geolocation data e.g., of road socket unit 301 position and, transmitting and recording relevant data into a remote database of remote server 303. The data may include, unique socket designation only or unique socket designation and unique parameters related to configuration of a road sensor unit, e.g., geolocation data, socket/road attributes, and the like. During the initial road socket installation and configuration process, setup unit 302 may be used in order to write data to the road socket unit 301, read existing data from road socket unit 301 and transmitting via wireless communication network 304 the data to a remote server 303.

According to embodiments of the invention, a setup unit 302 may include or may be connected to a geospatial location determining device, e.g., a GPS device, a sensor, e.g., an RFID reader, a programming device e.g., an RFID writer and a communication device to allow, for example, Internet connectivity.

Figure 4:
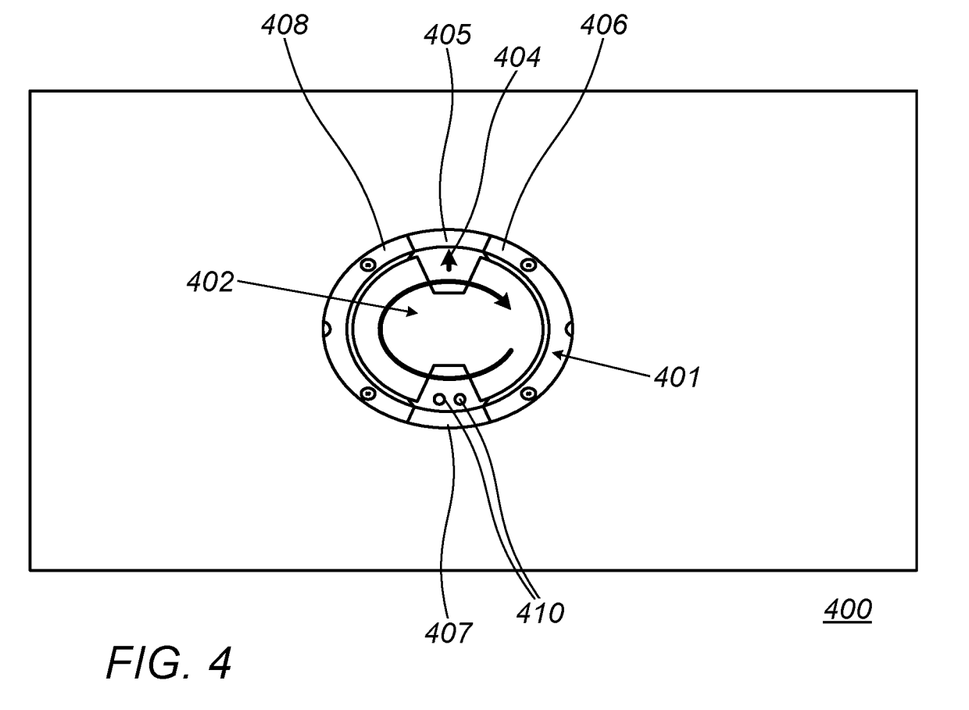
FIG. 4 is a schematic illustration of an auto-configuring road socket unit and an auto-configuring road sensor unit depicting misalignment and fault determination functionality according to embodiments of the present invention.

Reference is now made to FIG. 4 which is a schematic illustration of an auto-configuring road socket unit and an auto-configuring road sensor unit depicting misalignment and fault determination functionality according to embodiments of the present invention. According to embodiments of the invention, where an auto-configuring road sensor unit 402 may be erroneously or improperly inserted into a road socket 401. For example, in breach of location-dependent functionality e.g., where road sensor unit 402 may point in an incorrect direction, or where a road sensor unit 402 may have incorrect Light Emitting Diodes (LEDs) colors, road sensor unit 402 may automatically detect the same and issue an error indication. This error indication may be immediately presented, via one or more LEDs 410 disposed on road sensor unit 402 e.g., flashing/blinking LEDs, LEDs of a certain color, patterns of LEDs denoting an error code, etc.

For example, an error indication may arise when a road sensor unit with amber colored LEDs may be inserted into a road socket unit on a hard shoulder of a road, when such a location requires white colored LEDs. According to embodiments of the invention, each road sensor unit may be programmed to know its respective LED color, therefore having read the identification unit associated with the road socket into which it has been inserted, an error may be occurred and may indicate the same e.g., by blinking with a series of red LEDs.

An error indication may arise when, for example, road sensor unit 402 may be misaligned during installation into socket unit 401 such that it is facing in the opposite direction. For example, point 404 on road sensor unit 402 may be in a proper orientation when located at orientation 405, while being located in any orientation, it may be considered as a wrong orientation. For example, orientation 407, inverted by 180 degrees to its intended direction, or any orientations, for example, orientations 406 or 408. When wrong orientation may be detected, the identification unit of socket unit 401 and the configuration unit of sensor unit 402, e.g., an RFID reader and RFID tag may not be located within a predefined range or distance from each other and therefore the unique socket designation ID, and unique socket parameters may not be read by configuration unit of sensor unit 402. A consequence of this may be that a sequence of LEDs 410 denoting successful installation e.g., a sequence of green blinking LEDs may not be triggered and a sequence of LEDs 410 denoting an error thereby providing an error indication may be presented.

In some embodiments of the invention, an alert indication may be issued in the event that configuration unit of sensor unit 402, e.g., an RFID tag reader may unexpectedly lose connection to, or may unable to read identification unit of socket unit 401, e.g., an RFID tag. This may arise, for example, owing to a fault with the auto-configuring road sensor units 402 or road socket 401 e.g., RFID tag reader failure, and/or owing to an unexpected network manipulation or theft e.g., where an auto-configuring smart road sensor unit 402 may be stolen from road socket 401. The alert may be issued, for example, by a dedicated communicator disposed within the road socket unit 401.

In some embodiments of the invention, an alert may be issued in the event that a setup unit, e.g., unit 302 of FIG. 2 may be compositely connected to an auto-configuring smart road sensor unit 402 and may detect that geospatial location data of the road sensor unit varying e.g., GPS positioning may indicate that the road sensor is moving. This may occur, for example, in the event that the road sensor unit has been stolen and has been moved away from its respective road socket.

Figure 5:
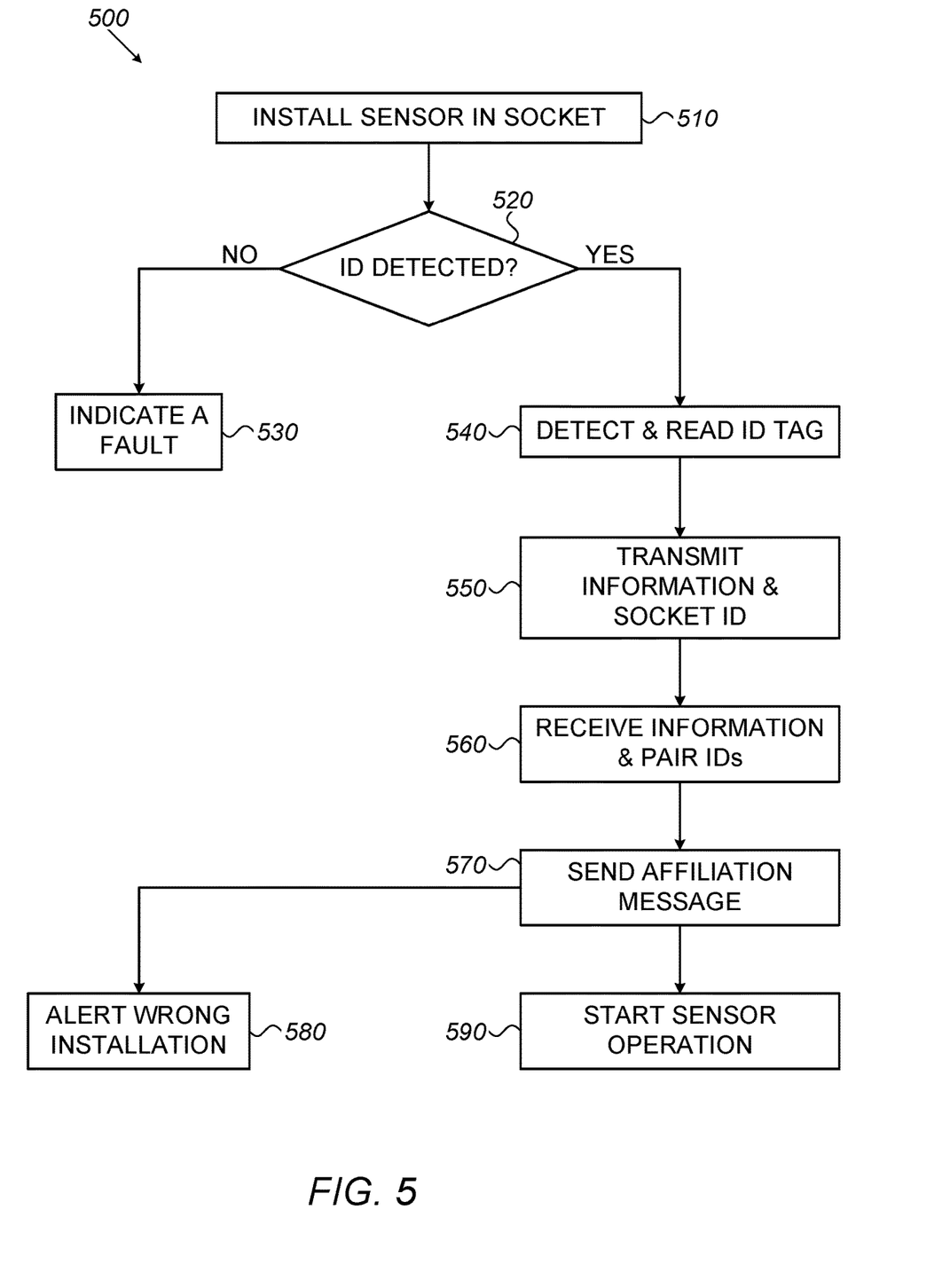
FIG. 5 is a high-level flow chart illustrating a method for automatically configuring a road sensor unit according to embodiments of the present invention.

FIG. 5 is a high-level flow chart illustrating a method for automatically configuring a road sensor unit according to embodiments of the present invention.

Flow chart 500 illustrates a configuration process of a road sensor unit and a socket unit. Operations of the method may be implemented, for example, using system 200 of FIG.

2, by one or more of the elements in system 200, namely, road sensor unit 202, road socket 201, gateway unit 208, remote server 203, communication network 204 and/or by suitable units, devices, and/or systems.

As indicated at box 510, embodiments of the invention may include installing a road sensor unit into a road socket unit. Road socket unit may include an identification unit, e.g., an RFID tag having a unique ID or designation and attributes or parameters related to the specific road socket and to a road sensor unit which may be inserted into that road socket unit. The road sensor unit may include a configuration unit, e.g., an RFID reader to read the identification unit of the road socket unit upon installation. Installing a smart road sensor unit into a road socket may include mechanically placing and tightening the road sensor unit into the socket by any tightening or securing means for example, by screws, bolts, or any other means.

According to some embodiments of the invention, prior to installing a smart road sensor into a road socket unit as indicated at box 510, embodiments of the invention may include implanting, into a road, a road socket unit having an identification unit denoting a unique socket designation, obtaining, using for example, a GNSS device connected with the road socket unit, geo-spatial location data relating to the road socket unit and transmitting, using a communication device the unique socket designation and said geo-spatial location data to a remote server.

As indicated at box 520, embodiments of the invention may include a determination whether an identification unit is detected by a road sensor unit or not. If an identification unit may not detected by a road sensor unit, as indicated at box 530, an indication of a fault installation may be generated, for example, by transmitting a fault signal and/or by indicating an error by one or more LEDs disposed on the road sensor unit. An error indication may be followed by a sensor unit replacement or fault investigation method.

As indicated at box 540, embodiments of the invention may include detecting, by the road sensor unit, (e.g., by the configuration unit of the road sensor unit), an identification unit of a road socket unit upon insertion of the road sensor unit into the road socket unit and reading, by the road sensor unit, a unique designation of the identification unit of the road socket unit. For example, if a sensor unit may detect a unique number of RFID tag of the road socket unit by an RFID reader of the sensor unit, the RFID reader may read the RFID tag. Some embodiments of the invention may include detecting an identification unit of the road socket unit by a configuration unit of the road sensor unit and reading, by the configuration unit of the road sensor unit, a unique designation of the identification unit of the road socket and unique parameters related to configuration of a road sensor unit.

As indicated at box 550, embodiments of the invention may include transmitting, by the road sensor unit, (e.g., by a communication module of the road sensor unit), the unique designation, and a unique sensor identification of the road sensor unit to a remote server. The unique sensor identification may be a unique number, text, symbol, or string of data that may characterize or identify a specific road sensor unit. The unique socket designation may be a unique number, text, symbol, or string of data that may characterize or identify a specific road socket unit.

In some embodiments of the invention, the identification unit may include also unique parameters related to configuration of a road sensor unit. Upon detecting an identification unit of the road socket unit by a configuration unit of the road sensor unit, embodiments of the invention may include reading by the configuration unit of the road sensor unit, a unique designation of the identification unit of the road socket and unique parameters related to configuration of a road sensor unit and transmitting the unique socket designation, the unique parameters and a unique sensor identification to a remote server to update the remote server of a link between the unique socket designation to unique parameters.

According to some embodiments of the invention, the unique socket designation, the unique sensor identification and, the unique parameters related to configuration of a road sensor unit and/or additional information or attributes may be transmitted first to a gateway unit or station, e.g., gateway unit 308 of FIG. 3 located along sideway of the road and from the gateway unit, the information may be transmitted by a communication module of the road sensor unit to the remote server for updating the remote server of a link between the unique designation of the identification unit to the unique parameters. The information may be transmitted via a wireless communication network such as radio communication or any wireless communication network. The remote processing facility or server may include one or more processors operable to collect information from a plurality of gateway units and a plurality of sensor units.

As indicated at box 560, embodiments of the invention may include receiving by the road sensor unit from the remote server, unique parameters, the unique parameters are based on the unique designation of the identification unit. The unique parameters related to configuration of a road sensor unit. The unique parameters may be identified based on the unique designation of the identification unit. The remote server may receive the unique socket designation and the unique sensor identification transmitted by the road sensor unit and may link or pair the unique socket designation to unique parameters related to configuration of a road sensor unit. In some embodiments of the invention, the remote server may draw or process socket information based on one or more of the identification information, ID, global coordinates and system attributes and may pair the socket identification number with the sensor identification number. According to some embodiments of the invention, remote server may include a database, that may hold a linking table, e.g., a hash table linking the unique socket designation to the unique parameters related to configuration of a road sensor unit. The unique parameters may include specific attributes such as GNSS location, system affiliation, radio channels and the like.

Upon sending the ID and socket information from the sensor unit to the gateway unit, the gateway unit may either address the remote server to get the attributes by either looking up the socket unique ID in its database or by sending them directly from the sensor unit. In either case, the gateway unit may inform the remote server of the linking between the specific socket and sensor so the remote server may log it in the remote database. Linking the unique socket designation to unique parameters may include checking a linking table stored in the remote server.

As indicated at box 570, embodiments of the invention may include receiving by the configuration unit of the road sensor unit, unique parameters related to configuration of a road sensor unit and an affiliation message sent from the remote server via the gateway unit to the sensor unit. embodiments of the invention may include configuring, by the road sensor unit, the road sensor unit to operate based on the unique parameter The affiliation message and unique parameters may include a specific configuration that may be received from the remote server or internally held by the gateway station and may instruct the sensor unit to operate per the specific configuration.

As indicated at box 580, if the remote server or gateway unit may detect a wrong installation of the sensor unit an alert may be issued indicating the wrong installation, for example, by instructing LEDs of the sensor unit to blink as to indicate the wrong installation. For example, it may be determined that a specific sensor unit is positioned a road shoulder and should have yellow LED while it has only red LED installed on it.

As indicated at box 590, embodiments of the invention may include operating road sensor unit with the configuration. The road sensor unit may be operated in accordance with the unique parameters received from the remote server if the remote server or gateway unit may not detect a wrong installation, or may detect a normal installation the sensor unit may be instructed to start operation, e.g., light constantly by the LEDs of the sensor unit.

It should be understood to a person skilled in the art that other operations or sets of operations may be used in accordance with embodiments of the invention.

Figure 6:
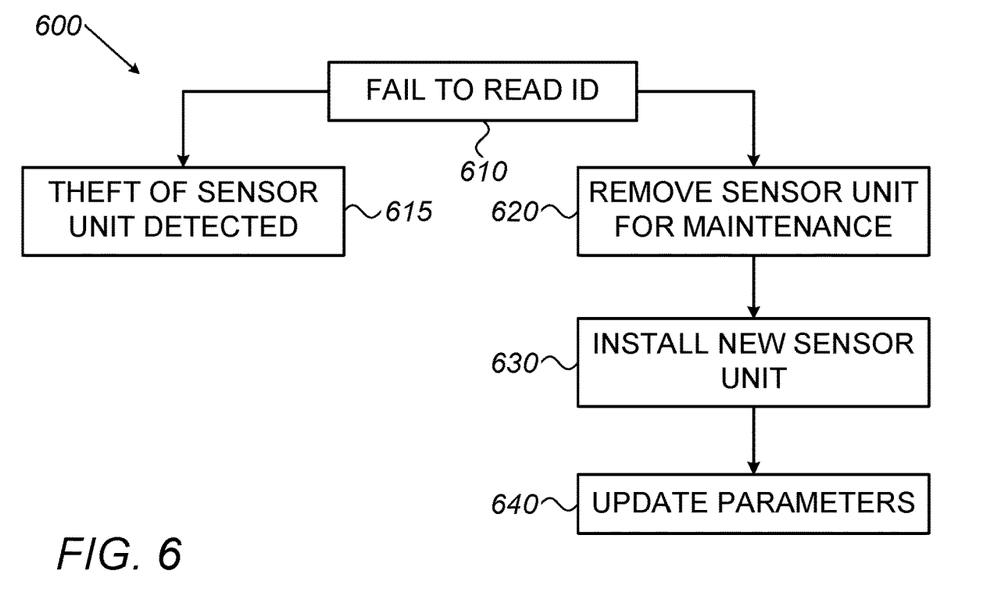
FIG. 6 is a high-level flow chart illustrating a method for maintaining road sensor unit according to embodiments of the present invention.

FIG. 6 is a high-level flow chart illustrating a method for maintaining road sensor unit according to embodiments of the present invention.

As indicated at box 610, embodiments of the invention may include failing to read an identification unit of a road socket unit, e.g., an RFID tag which may indicate a theft of a sensor unit, an unplanned destruction detection of the sensor unit or the socket or a maintenance requirement of a sensor unit. For example, during normal operation, the RFID reader may read the RFID tag periodically to ensure of verify its position. When a sensor unit may be removed, ruined, or harmed the configuration unit of a sensor unit may fail to read the identification unit of a road socket unit.

As indicated at box 615, embodiments of the invention may include a detection of a theft of the road sensor unit, for example, if no planned maintenance is required, the sensor unit may send an SOS message to a gateway unit alarming it may not detect a road socket unit and indicating a risk of theft. Gateway unit may alert a remote server of a possible theft, alternatively the SOS message may be sent directly to the remote server from the sensor unit.

As indicated at box 620, if failing to read an identification unit of a road socket unit may occur due to a removal of a sensor unit during a planned maintenance procedure or a planned sensor unit swapping, embodiments of the invention may include removing a sensor unit for maintenance and installing a new sensor unit into a road socket unit, as indicated in box 630. The installation process may be identical to the installation process described with reference to FIG. 5.

As indicated at box 640, if the parameters of the new sensor units and the old, replaced sensor unit may be different, the parameters may be updated by the remote server and a new pairing between a socket designation and a sensor unit ID may be performed. Embodiments of the invention may include discarding of the previous, old sensor unit parameters from a remote server database.

It should be understood to a person skilled in the art that other operations or sets of operations may be used in accordance with embodiments of the invention.

Figure 7:
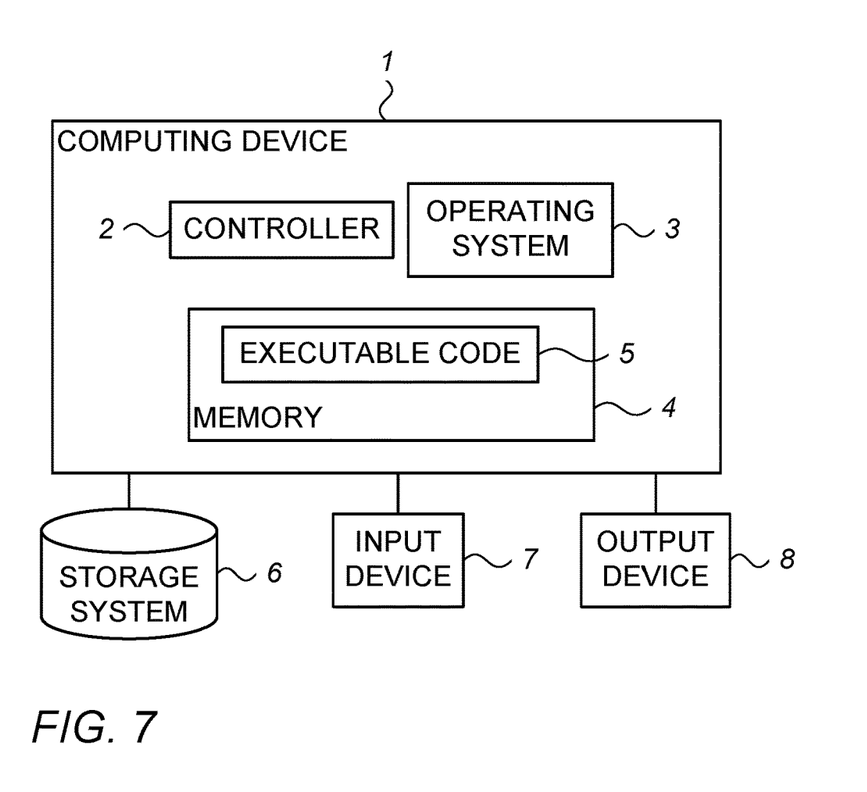
FIG. 7 is a block diagram depicting a computing device, which may be included within an embodiment of the present invention.

Reference is made now to FIG. 7 which is a block diagram depicting a computing device, which may be included within an embodiment of the present invention. Computing device 1 or elements of computing device 1 may be or may be included in element or units according to embodiments of the invention, for example, by remote server 203, road sensor unit 202, gateway unit 208 and road socket unit 201 of FIG. 1.

Computing device 1 may include a controller 2 that may be, for example, a central processing unit (CPU) processor, a chip or any suitable computing or computing device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may allow automatically connecting in a wireless network as further described herein. Although, for the sake of clarity, a single item of executable code 5 is shown in FIG. 7, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 4 where it may be processed by controller 2. In some embodiments, some of the components shown in FIG. 7 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors, controllers (e.g., controllers similar to controller 2), microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, a smart phone, a tablet device or any other suitable computing device. Where applicable, modules or units described herein, may be similar to, or may include components of, device 1 described herein.

Unless otherwise indicated, the functions described hereinabove may be performed by executable code and instructions stored in computer readable medium and running on one or more processor-based systems. However, state machines, and/or hardwired electronic circuits can also be utilized. Further, with respect to the example processes described hereinabove, not all the process states need to be reached, nor do the states have to be performed in the illustrated order. Further, certain process states that are illustrated as being serially performed can be performed in parallel. Moreover, those skilled in the art will appreciate that the invention may be practiced with other computer system configurations, including multiprocessor systems, microprocessor-based electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The terms, "for example", "e.g.", "optionally", as used herein, are intended to be used to introduce non-limiting examples. While certain references are made to certain example system components or algorithms, other components and algorithms can be used as well and/or the example components can be combined into fewer components and/or divided into further components.

All the above description and examples have been given for the purpose of illustration and are not intended to limit the invention in any way. Many different measurement probes, methods of analysis, electronic and logical elements can be employed, all without exceeding the scope of the invention.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents

The invention claimed is:

1. A method for automatically configuring a road sensor unit, comprising:
   detecting, by the road sensor unit, an identification unit of a road socket unit upon mechanical insertion of the road sensor unit into the road socket unit;
   reading, by the road sensor unit, a unique designation of the identification unit of the road socket unit;
   transmitting, by the road sensor unit, the unique designation and a unique sensor identification of the road sensor unit to a remote server;
   receiving, by the road sensor unit from the remote server, unique parameters, wherein the unique parameters are based on the unique designation of the identification unit;
   configuring, by the road sensor unit, the road sensor unit to operate based on the unique parameter; and
   operating said road sensor unit with the configuration.

2. The method of claim 1, further comprising updating the remote server of a link between the unique designation and the unique sensor identification.

3. The method of claim 1, wherein the road socket unit is adapted to be mechanically inserted into the road sensor unit such that the configuration unit of the road sensor unit and the identification unit of the road socket unit are within a predefined distance to allow the reading of the unique designation of the identification unit by the configuration unit of the road sensor unit.

4. The method of claim 1, wherein transmitting and receiving is performed via a gateway unit connected to the road sensor unit and the remote server.

5. The method of claim 1, further comprising linking the unique designation to the unique parameters by checking a linking table stored in the remote server.

6. The method of claim 1, further comprising periodically scanning by the road sensor unit for one or more identification unit of one or more road socket units.

7. The method of claim 1, further comprising issuing an alert by the road sensor unit when a predefined event is occurred.

8. The method of claim 7, wherein said alert is indicated by one or more Light Emitting Diodes (LEDs) disposed on said road sensor unit.

9. The method of claim 1, wherein transmitting and receiving is performed via wireless communication connectivity.

10. A method for automatically configuring a road sensor unit, comprising:
    detecting, by the road sensor unit, an identification unit of the road socket unit upon mechanical insertion of the road sensor unit into the road socket unit;
    reading, by the road sensor unit, a unique designation of the identification unit of the road socket unit and unique parameters related to configuration of the road sensor unit;
    configuring, by the road sensor unit, the road sensor unit to operate based on the unique parameter;
    operating said road sensor unit with the configuration; and
    transmitting, by the road sensor unit, the unique designation of the identification unit, the unique parameters and a unique sensor identification to a remote server.

11. The method of claim 10, further comprising updating the remote server of a link between the unique designation and the unique sensor identification.

12. The method of claim 10, wherein the road socket unit is adapted to be mechanically inserted into the road sensor unit such that the configuration unit of the road sensor unit and the identification unit of the road socket unit are within a predefined distance to allow the reading of the unique designation of the identification unit by the configuration unit of the road sensor unit.

13. The method of claim 10, wherein transmitting and receiving is performed via a gateway unit connected to the road sensor unit and the remote server.

14. The method of claim 10, further comprising linking the unique designation to the unique parameters by checking a linking table stored in the remote server.

15. The method of claim 10, further comprising periodically scanning by the road sensor unit for one or more identification unit of one or more road socket units.

16. The method of claim 10, further comprising issuing an alert by the road sensor unit when a predefined event is occurred.

17. The method of claim 16, wherein said alert is indicated by one or more Light Emitting Diodes (LEDs) disposed on said road sensor unit.

18. A system for automatically configuring a road sensor unit, comprising:
    a road socket unit comprising an identification unit; and
    a road sensor unit configured to be mechanically inserted into the road socket unit, the road sensor unit comprising a processor configured to:
    detect an identification unit of the road socket unit upon mechanical insertion of the road sensor unit into the road socket unit;
    read a unique designation of the identification unit of the road socket unit;
    transmit the unique designation and a unique sensor identification of the road sensor unit to a remote server;
    receive from the remote server, unique parameters, wherein the unique parameters are based on the unique designation of the identification unit;
    configure the road sensor unit to operate based on the unique parameter; and
    operate said road sensor unit with the configuration.

19. The system of claim 18, wherein the processor configured to update the remote server of a link between the unique designation and the unique sensor identification.

20. The system of claim 18, wherein the road socket unit is adapted to be mechanically inserted to the road sensor unit such that the processor of the road sensor unit and the identification unit of the road socket unit are located within a predefined distance to allow the reading of the unique designation of the identification unit by the configuration unit of the road sensor unit.

21. The system of claim 18, further comprises a gateway unit connected to the road sensor unit and to the remote server to transmit and receive information to and from the road sensor unit and the remote server.

22. The system of claim 18, wherein the road sensor unit comprises one or more Light Emitting Diodes (LEDs) to indicate when a predefined event is occurred.

\* \* \* \* \*